US012650029B2

(12) United States Patent
Sieme et al.

(10) Patent No.: US 12,650,029 B2
(45) **Date of Patent: *Jun. 9, 2026**

(54) PORTABLE LOCK APPARATUS

(71) Applicant: Schlage Lock Company LLC, Carmel, IN (US)

(72) Inventors: Joerg Sieme, Ostbevern (DE); Arno Winter, Ahaus Ottenstein (DE)

(73) Assignee: Schlage Lock Company LLC, Carmel, IN (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/823,173

(22) Filed: Sep. 3, 2024

(65) Prior Publication Data

US 2025/0207432 A1 Jun. 26, 2025

Related U.S. Application Data

(63) Continuation of application No. 17/545,368, filed on Dec. 8, 2021, now Pat. No. 12,077,988.

(51) Int. Cl.

| | |
|---|---|
| ***E05B 37/02*** | (2006.01) |
| ***E05B 37/00*** | (2006.01) |
| ***E05B 67/22*** | (2006.01) |

(52) U.S. Cl.

CPC ........ *E05B 37/025* (2013.01); *E05B 37/0058* (2013.01); *E05B 67/22* (2013.01)

(58) Field of Classification Search

CPC .... E05B 37/025; E05B 37/0058; E05B 67/22; E05B 67/24

(Continued)

(56) References Cited

U.S. PATENT DOCUMENTS 6,386,005 B1 * 5/2002 Kuo ...................... E05B 37/025 70/30
12,077,988 B2 * 9/2024 Sieme .................. E05B 67/003
(Continued)

FOREIGN PATENT DOCUMENTS

DE 201007035116 A1 1/2009
DE 102005063514 B4 6/2010
(Continued)

OTHER PUBLICATIONS

European Examination Report; European Patent Office; European Application No. 22212366.3; Mar. 13, 2024; 4 pages.
(Continued)

*Primary Examiner* — Nathan Cumar
(74) *Attorney, Agent, or Firm* — Taft Stettinius & Hollister LLP

(57) ABSTRACT

An example lock apparatus includes a shackle including an engagement portion, and a lock head operable to selectively engage the engagement portion to thereby retain the lock apparatus in a closed condition. The lock head includes a housing, a slider, and a detent mechanism. The slider is mounted for sliding movement relative to the housing between a first position and a second position. One of the first position or the second position is a closed position in which the slider prevents removal of the engagement portion from the lock head, and the other of the first position or the second position is an open position in which the slider permits removal of the engagement portion from the lock head. The detent mechanism is configured to selectively resist movement of the slider from the first position.

20 Claims, 8 Drawing Sheets

(58) Field of Classification Search
USPC .............................................................. 70/25
See application file for complete search history.

(56) References Cited

U.S. PATENT DOCUMENTS

| | | | | |
|---|---|---|---|---|
| 2005/0092037 | A1* | 5/2005 | Meekma | E05B 67/003 70/30 |
| 2006/0169007 | A1* | 8/2006 | Fiegener | E05B 37/025 70/25 |
| 2013/0167599 | A1* | 7/2013 | Avganim | E05B 37/02 70/332 |
| 2014/0041423 | A1* | 2/2014 | Zuraski | E05B 37/0048 70/315 |
| 2017/0169637 | A1* | 6/2017 | Lai | E05B 49/00 |
| 2018/0016812 | A1* | 1/2018 | Sanford | E05B 37/0068 |
| 2018/0165901 | A1* | 6/2018 | Lai | E05B 67/24 |
| 2018/0320416 | A1* | 11/2018 | Lai | E05B 67/24 |
| 2019/0010728 | A1* | 1/2019 | Ramakrishna | E05B 67/003 |

FOREIGN PATENT DOCUMENTS

| | | | | |
|---|---|---|---|---|
| DE | 102010036636 | A1 | 2/2012 | |
| DE | 202016000005 | U1 | 2/2016 | |
| EP | 3741937 | A1 | 11/2020 | |
| EP | 3741932 | B1 * | 10/2023 | E05B 71/00 |
| GB | 2229220 | A | 9/1990 | |
| WO | 2019010489 | A1 | 1/2019 | |
| WO | 2021043591 | A1 | 3/2021 | |

OTHER PUBLICATIONS

Extended European Search Report; European Patent Office; European Application No. 22212366.3; Apr. 20, 2023; 8 pages.

Bigamart; Movigor Mini Portable Bicycle Folding Lock Compact Cycling Bike Security Password Lock—Heavy Duty Steel Alloy 4 Codes—Unfolds to 85cm/33.5" | Weight 900g/2LB; Copyright Bigamart 2021; 7 pages.

Kryptonite; KryptoLok 912 Combo Chain; 5 pages.

Kryptonite; KryptoLok 990 Combo Chain; 7 pages.

International Search Report; International Searching Authority; International Application No. PCT/US2022/052270; Mar. 29, 2023; 2 pages.

Written Opinion of the International Searching Authority; International Searching Authority; International Application No. PCT/US2022/052270; Mar. 29, 2023; 6 pages.

CA Examination Report; Canadian Intellectual Property Office; Canadian Patent Application No. 3,240,401; Dec. 4, 2025; 3 pages.

* cited by examiner

PORTABLE LOCK APPARATUS

CROSS-REFERENCE TO RELATED APPLICATIONS

The present application is a continuation of U.S. patent application Ser. No. 17/545,368 filed Dec. 8, 2021 and issued as U.S. Pat. No. 12,077,988, the contents of which are hereby incorporated by reference in their entirety.

TECHNICAL FIELD

The present disclosure generally relates to locks, and more particularly but not exclusively relates to portable locks.

BACKGROUND

Many existing portable mechanical locks utilize a push-button that, when depressed, unlocks the lock. However, it has been found that such pushbuttons may be susceptible to attack, for example by striking with a hammer. Additionally, certain existing portable combination locks have drawbacks and limitations with regard to the mechanism for resetting the combination. For these reasons among others, there remains a need for further improvements in this technological field.

SUMMARY

An example lock apparatus includes a shackle including an engagement portion, and a lock head operable to selectively engage the engagement portion to thereby retain the lock apparatus in a closed condition. The lock head includes a housing, a slider, and a detent mechanism. The slider is mounted for sliding movement relative to the housing between a first position and a second position. One of the first position or the second position is a closed position in which the slider prevents removal of the engagement portion from the lock head, and the other of the first position or the second position is an open position in which the slider permits removal of the engagement portion from the lock head. The detent mechanism is configured to selectively resist movement of the slider from the first position. Further embodiments, forms, features, and aspects of the present application shall become apparent from the description and figures provided herewith.

DETAILED DESCRIPTION OF ILLUSTRATIVE EMBODIMENTS

Figure 1:
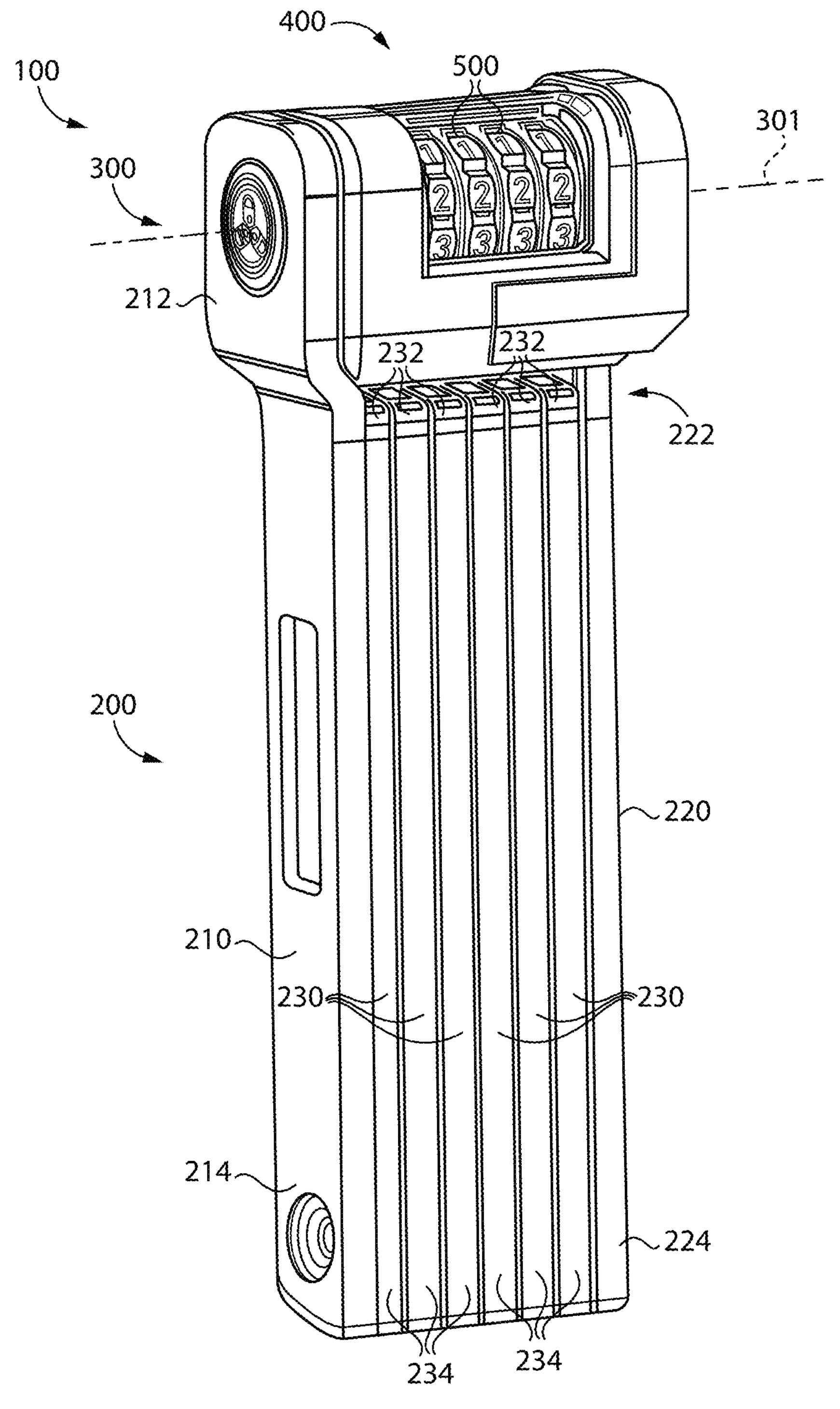
FIG. 1 is a perspective view of a lock apparatus according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a portable lock apparatus 100 according to certain embodiments. The portable lock apparatus 100 generally includes a shackle 200 and a lock head 300 according to certain embodiments. As described herein, when the lock apparatus 100 is in an unlocked condition, the shackle 200 can be wrapped around a portion of a first object (e.g., a portable object such as a bicycle) and a portion of a second object (e.g., a stationary object such as a bike stand or a light pole), and thereafter secured to the lock head 300 to form a loop such that the lock apparatus 100 couples the first object to the second object.

The illustrated shackle 200 is provided in the form of a folding shackle, and generally includes a plurality of links, including a first link 210, a second link 220, and one or more intermediate links 230 connected between the first link 210 and the second link 220. As described herein, at least the second link 220 is selectively secured to the lock head 300 such that the second link 220 can be removed from the lock head 300 to open the loop defined by the lock apparatus 100.

The first link 210 includes a first end portion 212 coupled to the lock head 300 and an opposite second end portion 214 connected with the second link 220, such as via the one or more intermediate links 230. In the illustrated form, the first end portion 212 is permanently and pivotably coupled to the lock head 300 such that the first link 210 is pivotable about a longitudinal axis 301 of the lock head 300. It is also contemplated the first link 210 may not necessarily be pivotable relative to the lock head 300 and/or may be selectively coupled to the lock head 300. For example, in certain embodiments, the first link 210 may be secured to the lock head 300 when the lock apparatus 100 is in its locked state, and may be removable from the lock head 300 when the lock apparatus 100 is in its unlocked state.

The second link 220 includes a first end portion 222 selectively coupled to the lock head 300 and an opposite second end portion 224 connected with the first link 210, such as via the one or more intermediate links 230. As described herein, the first end portion 222 includes an opening 223 that receives a pin 313 of the lock head 300 (FIG. 2), and a slider 320 of the lock head 300 selectively retains engagement between the pin 313 and the opening 223. The first end portion 222 may thus be referred to as an engagement portion of the shackle 200.

Each intermediate link 230 includes a first end portion 232 and an opposite second end portion 234. Each first end portion 232 is pivotably coupled with the first end portion 232 of an adjacent intermediate link 230, and each second end portion 234 is pivotably connected with the second end portion of an adjacent link. More particularly, the second end portion 234 of the leftmost intermediate link 230 in the illustration of FIG. 1 is pivotably coupled with the second end portion 214 of the first link 210, the second end portion of the rightmost intermediate link 230 in the illustration of FIG. 1 is pivotably coupled with the second end portion 224 of the second link 220, and the second end portion 234 of each other intermediate link 230 is pivotably coupled with the second end portion 234 of one adjacent intermediate link 230.

While the illustrated shackle 200 comprises a plurality of pivotably coupled links 210, 220, 230, it is also contemplated that the shackle 200 may take another form. As one example, a shackle may comprise a chain, and the engagement portion may be defined by or coupled to an end link of the chain. As another example, a shackle may comprise a cable, and the engagement portion may be defined by or coupled to an end portion of the cable. As a further example, the shackle may be a rigid shackle, and may, for example, be generally U-shaped. In such forms, a foot of the rigid shackle may define the engagement portion of the shackle.

Figure 2:
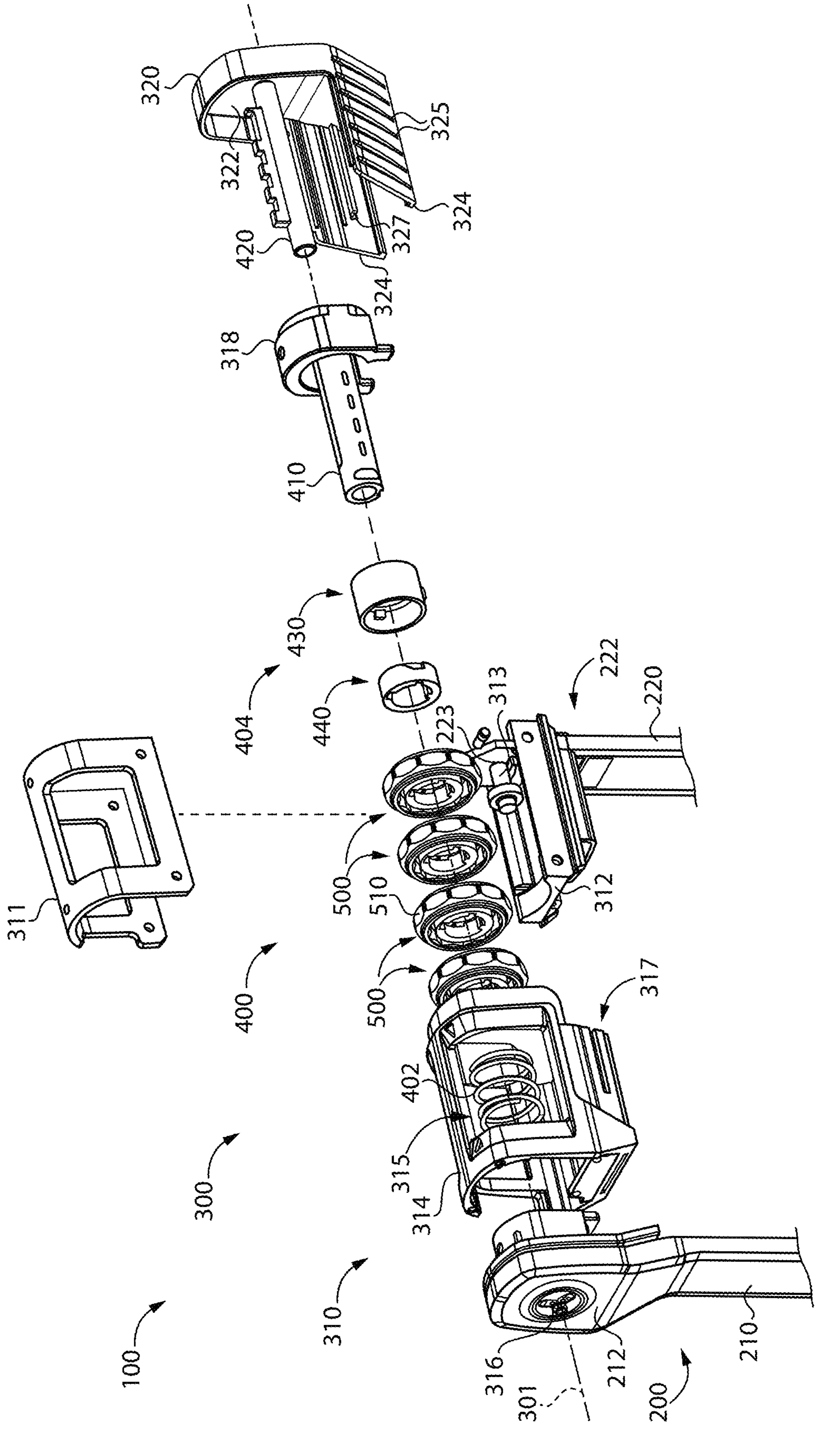
FIG. 2 is an exploded assembly view of a portion of the lock apparatus.

With additional reference to FIG. 2, the lock head 300 generally includes a housing 310, a slider 320 mounted for movement relative to the housing 310 along the longitudinal axis 301, and a lock mechanism 400 according to certain embodiments. As described herein, the lock mechanism 400 is configured to selectively prevent movement of the slider 320 to thereby selectively retain the lock apparatus 100 in its closed condition. In the interest of clarity, certain components of the lock apparatus 100 (including the intermediate links 230) are omitted from the illustration of FIG. 2.

In the interest of convenience of description, the longitudinal axis 301 may be considered to define a proximal direction (generally to the left in FIG. 2) and an opposite distal direction (generally to the right in FIG. 2). It should be appreciated that motion or spacing along a direction defined by one axis need not preclude motion or spacing along a direction defined by another of axis. For example, elements that are described as being "longitudinally offset" from one another may also be offset in a transverse direction, or may be aligned in the transverse direction. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

The housing 310 generally includes a base 312, a pin 313 secured to the base 312, a case 314 secured to the base 312, a pivot bracket 316 mounted to the case 314, and an end portion 318 mounted to the case 314. In certain embodiments, a cover 311 may be mounted to the case 314, and may provide additional resistance to attack and/or a desired aesthetic for the lock apparatus 100. When the lock apparatus 400 is in its closed condition, the pin 313 projects into the opening 223 in the second link 220 and prevents removal of the second link 220 from the housing 310. The case 314 defines a window 315 through which outer dials 510 of the lock mechanism 400 are accessible and rotatable, and a pair of longitudinal grooves 317 that guide the slider 320 for longitudinal movement relative to the housing 310. The illustrated pivot bracket 316 pivotably couples the first end portion 212 of the first link 210 to the housing 310. An outer spindle 410 of the lock mechanism 400 is secured to the end portion 318 and extends proximally from the end portion 318.

The slider 320 includes a base portion 322 and a pair of arms 324 that extend longitudinally from the base portion 322. A series of ridges 325 may be formed on outer sides of the arms 324 to facilitate manual grasping of the slider 320. In the illustrated form, a pair of splines 327 are formed on the inner sides of the arms 324, and engage with the grooves 317 to limit the slider 320 to longitudinal movement along the axis 301. As described herein, the slider 320 is selectively movable relative to the housing 310 between a closed position (FIG. 6) and an open position (FIG. 8), and the lock mechanism 400 selectively retains the slider 320 in the closed position. Moreover, when the slider 320 is in the closed position, the slider 320 prevents removal of the pin 313 from the opening 223, and thereby secures the second link 220 to the lock head 300.

Figure 3:
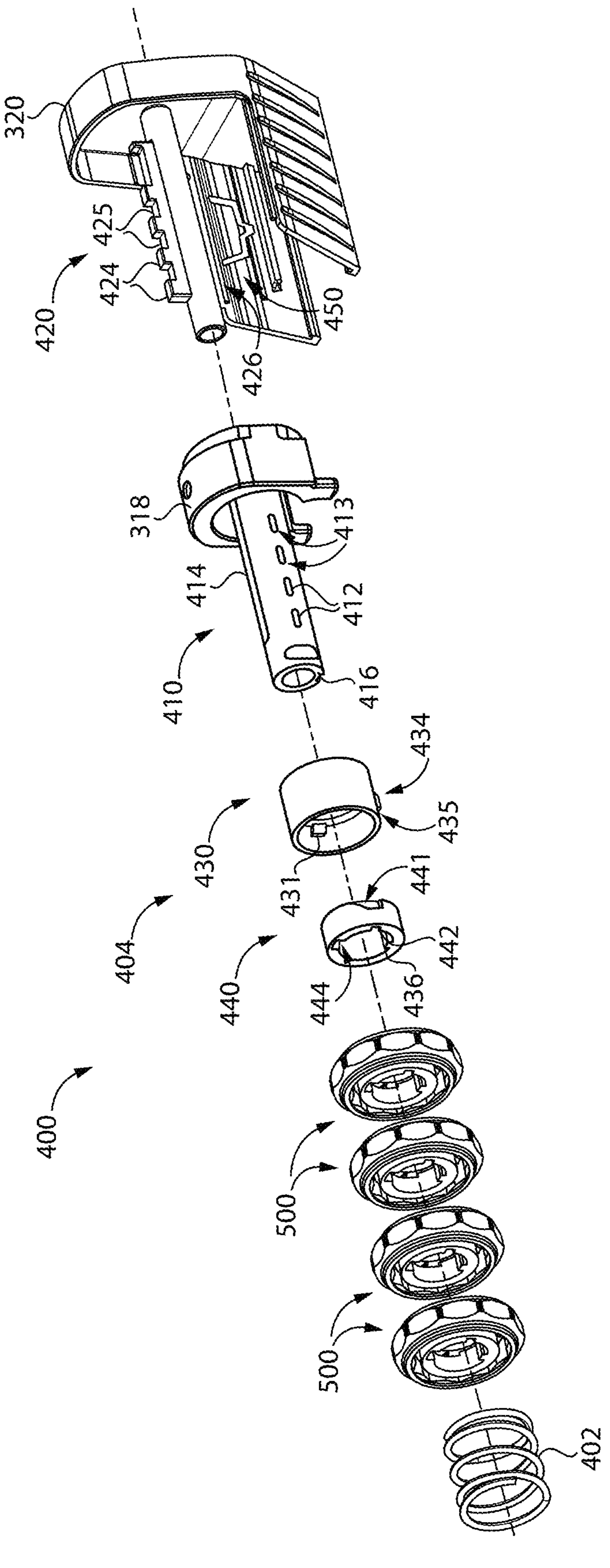
FIG. 3 is an exploded assembly view of a portion of a lock head of the lock apparatus.
Figure 4:
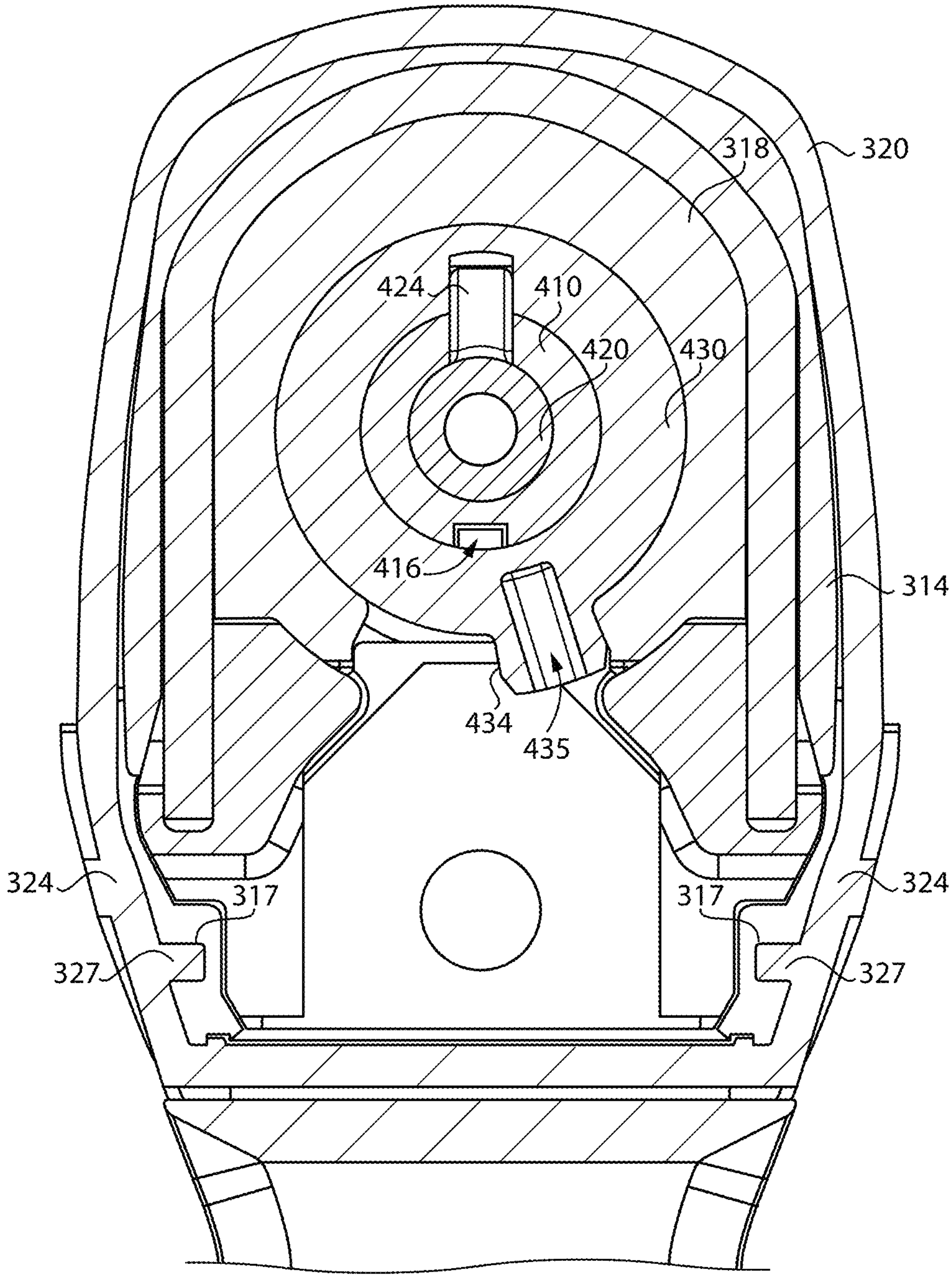
FIG. 4 is a cross-sectional view of a portion of the lock apparatus.

With additional reference to FIGS. 3 and 4, the lock mechanism 400 generally includes an outer spindle 410 secured to the housing 310, an inner spindle 420 secured to the slider 320, a reset collar 430 rotatably mounted to the outer spindle 410, a cam collar 440 slidably mounted to the outer spindle 410, and a plurality of code units 500 mounted to the outer spindle 410. In certain embodiments, the reset collar 430 and/or the cam collar 440 may be considered to constitute at least a portion of a reset mechanism 404 operable to change an authorized code of the lock mechanism 400. As described herein, each code unit 500 has a locking state in which the code unit 500 prevents movement of the slider 320 from its closed position to its open position, and an unlocking state in which the code unit 500 does not prevent movement of the slider 320 to its open position.

The outer spindle 410 is secured to the housing 310, and extends proximally from the end portion 318 through the code units 500. The outer spindle 410 is generally hollow, and includes a slot 414 that communicates with the hollow interior of the outer spindle 410. The outer spindle 410 includes a plurality of longitudinally-extending first splines 412, which are separated from one another by first gaps 413. The illustrated outer spindle 410 further includes a longitudinal groove 416, which may be opposite the slot 414.

The inner spindle 420 is secured to the slider 320, and extends proximally from the slider base 322 into the hollow interior of the outer spindle 410. The inner spindle 420 includes a plurality of second splines 424, which project through the slot 414 and are separated from one another by second gaps 425. A channel 426 is formed within the inner spindle 420, and the detent mechanism 450 is seated in the channel 426.

The reset collar 430 is rotatably mounted to the outer spindle 410, and includes a pair of projections 431 formed on a radially inner side thereof. The reset collar 430 also includes a post 434 defining an opening 435 operable to receive a tool for rotation of the reset collar 430. As described herein, the opening 435 is inaccessible by the tool when the slider 320 is in its closed position, and is accessible by the tool when the slider 320 is in its open position.

The cam collar 440 is slidably mounted to the outer spindle 410 for sliding movement along the longitudinal axis 301, and generally includes a pair of ramps 441 configured to engage the projections 431 of the reset collar 430 such that rotation of the reset collar 430 from a home position to a rotated position longitudinally drives the cam collar 440 from a home position to a reset position. Formed within the cam collar 440 are a first channel 442, a second channel 444, and a spline 446. The first channel 442 and the second channel 444 respectively accommodate the first splines 412 of the outer spindle 410 and the second splines 424 of the inner spindle 420 during installation of the cam collar 440, and the spline 446 engages with the groove 416 to rotationally couple the cam collar 440 with the outer spindle 410.

The detent mechanism 450 comprises a bias member 452 that is seated within the channel 426 defined by the inner spindle 420, and in the illustrated embodiment is provided in the form of a leaf spring that is bent to define a projection 458. As described herein, the projection 458 is operable to engage recesses 418, 418' (FIGS. 7 and 9) formed within the outer spindle 410, which can provide audible and/or tactile feedback indicating that the slider 320 has reached a desired position. Additionally or alternatively, such engagement may selectively retain the slider 320 in the desired position. In certain embodiments, the detent mechanism 450 may be considered to include the recesses 418, 418'.

While the illustrated detent mechanism 450 comprises a projection 458 that engages recesses 418, 418' in the outer spindle 410, other configurations are also contemplated. As one example, the projection 458 may engage recesses formed in another component of the housing 310. It is also contemplated that this configuration may be reversed such that the detent mechanism 450 defines a recess that engages projections within the outer spindle 410 or a component of the housing 310. Furthermore, while the illustrated detent mechanism 450 comprises a bias member 452 in the form of a leaf spring that urges the projection 458 into engagement with the recess 418, it is also contemplated that another form of bias member may be utilized, such as a compression spring, a torsion spring, an extension spring, an elastic member, and/or one or more magnets. Such a bias member may, for example, bias a projection such as a ball or other roller into a recess.

Figure 5:
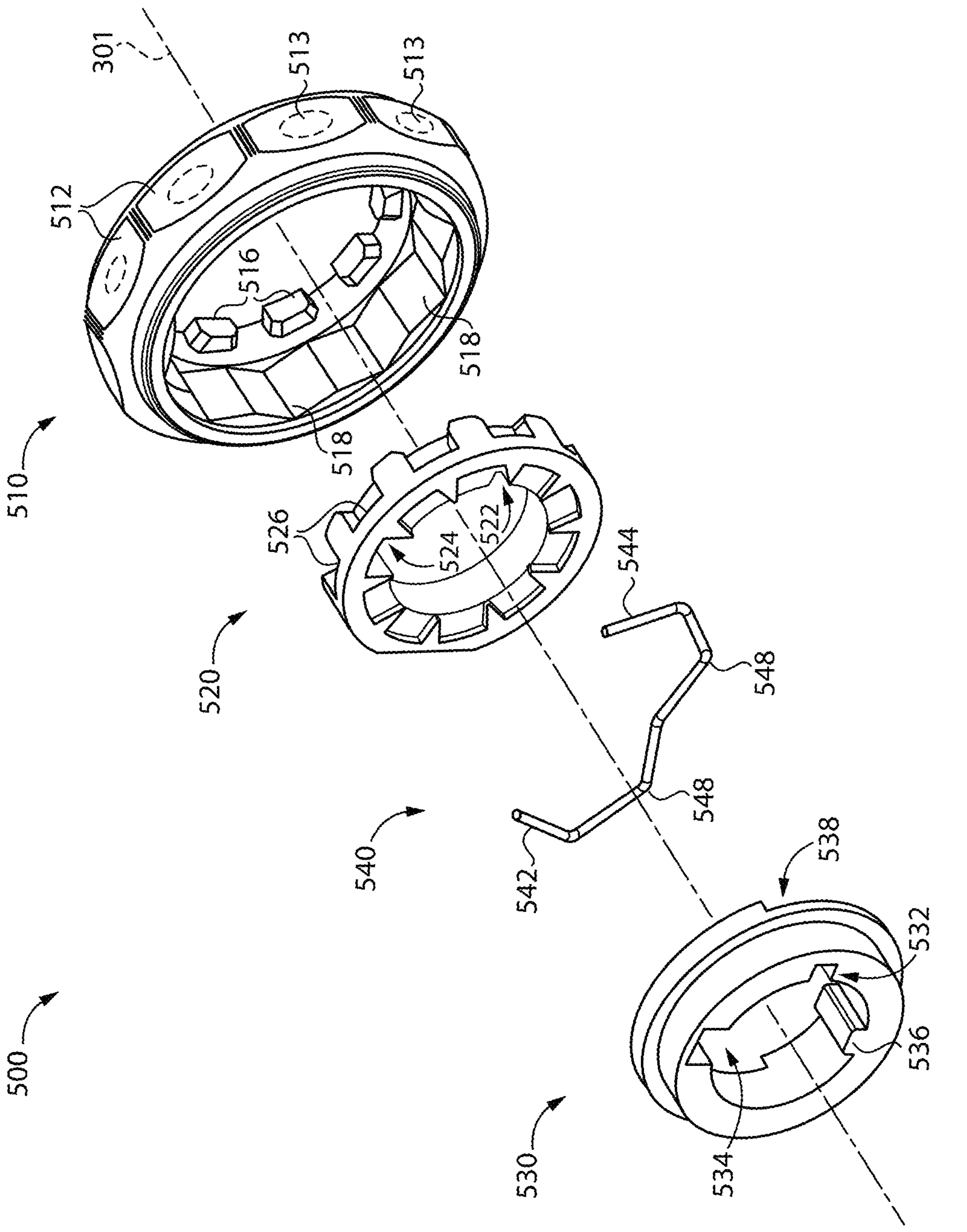
FIG. 5 is an exploded assembly view of a code unit according to certain embodiments.

With additional reference to FIG. 5, each code unit 500 is mounted to the outer spindle 410, and generally includes an outer dial 510 and an inner dial 520, and may further include a support sleeve 530 and/or a detent spring 540. As described herein, each code unit 500 has an engaged state in which the inner dial 520 is engaged with the outer dial 510 such that the dials 510, 520 rotate jointly, and a disengaged state in which the inner dial 520 is disengaged from the outer dial 510 such that the outer dial 510 is rotatable relative to the inner dial 520. Moreover, the code units 500 are biased toward their engaged state by a bias mechanism 402, and the reset mechanism 404 is operable to move the code units 500 to their disengaged states against the urging of the bias mechanism 402. In the illustrated form, the bias mechanism 402 is provided in the form of a compression spring. It is also contemplated that the bias mechanism 402 may be provided in another form, such as one including an extension spring, a torsion spring, a leaf spring, an elastic member, and/or one or more magnets.

The outer dial 510 generally includes a plurality of faces 512 formed on an outer side thereof, and one or more projections 516 projecting radially inward from an inner periphery of the outer dial 510. The faces 512 may include indicia 513 that facilitate proper entry of a code to the lock mechanism 400. The indicia 513 may, for example, be provided in the form of numbers and/or letters. In certain embodiments, the inner periphery of the outer dial 510 may include a plurality of recesses 518, each corresponding to a respective one of the faces 512.

The inner dial 520 generally includes a first channel 522 operable to receive one of the first splines 412, a second channel 524 operable to receive one of the second splines 424, and one or more recesses 526 corresponding to the one or more projections 516. As described herein, the one or more recesses 526 are operable to receive the one or more projections 516 to rotationally couple the inner dial 520 with the outer dial 510 for joint rotation about the longitudinal axis 301. The inner dial 520 is longitudinally movable from this coupled or home position to a decoupled or reset position, in which the inner dial 520 is disengaged from the outer dial 510 such that the outer dial 510 is rotatable relative to the inner dial 520.

The support sleeve 530 is slidably mounted to the outer spindle 410, and generally includes a first channel 532 operable to receive one of the first splines 412, and a second channel 534 operable to receive one of the second splines 424. The support sleeve 530 also includes a spline 536 configured to be seated in the groove 416 for rotational coupling of the support sleeve 530 with the outer spindle

410. The support sleeve 530 also includes a recess 538 that receives at least a portion of the detent spring 540.

The detent spring 540 includes a first end 542, a second end 544, and one or more bends 548 formed between the first end 542 and the second end 544. Each of the first end 542 and the second end 544 is received in the recess 538 such that detent spring 540 is captured between the support sleeve 530 and the inner dial 520. During rotation of the outer dial 510, the bend 548 engages the recesses 518 to selectively resist rotation of the outer dial 510 while biasing the outer dial to a nearest seated position of a plurality of seated positions. For example, if the outer dial 510 is near a seated position in which the number "5" is displayed, engagement between the detent spring 540 and one of the recesses 518 will urge the outer dial 510 toward the seated position in which the number "5" is displayed.

As noted above, each code unit 500 has a locking state and an unlocking state. When in the locking state, the second channel 524 of the inner dial 520 is misaligned with the splines 424 of the inner spindle 420 such that the code unit 500 blocks distal movement of the inner spindle 420, thereby preventing movement of the slider 320 from the closed position toward the open position. When any of the code units 500 is in its locking state, the slider 320 is retained in its closed position such that the pin 313 cannot be removed from the opening 223, and the second link 220 remains secured to the lock head 300. Thus, any of the code units 500 being in the locking state defines a locked state of the lock apparatus 100.

When a code unit 500 is in its unlocking state, the second channel 524 is aligned with the corresponding second spline 424 such that the code unit 500 does not block distal movement of the inner spindle 420. The code unit 500 can be moved between its locking state and its unlocking state by rotating the outer dial 510 to a position in which the appropriate indicium 513 is displayed, thereby rotating the inner dial 520 to a position in which each channel 524 is aligned with the corresponding spline 424. When each code unit 500 is in its unlocking state, the slider 320 is movable from its closed position to its open position to permit removal of the pin 313 from the opening 223, thereby permitting decoupling of the first end portion 222 of the second link 220 from the lock head 300. With the first end portion 222 of the second link 220 decoupled from the lock head 300, the lock apparatus 100 is in an open state.

Figure 6:
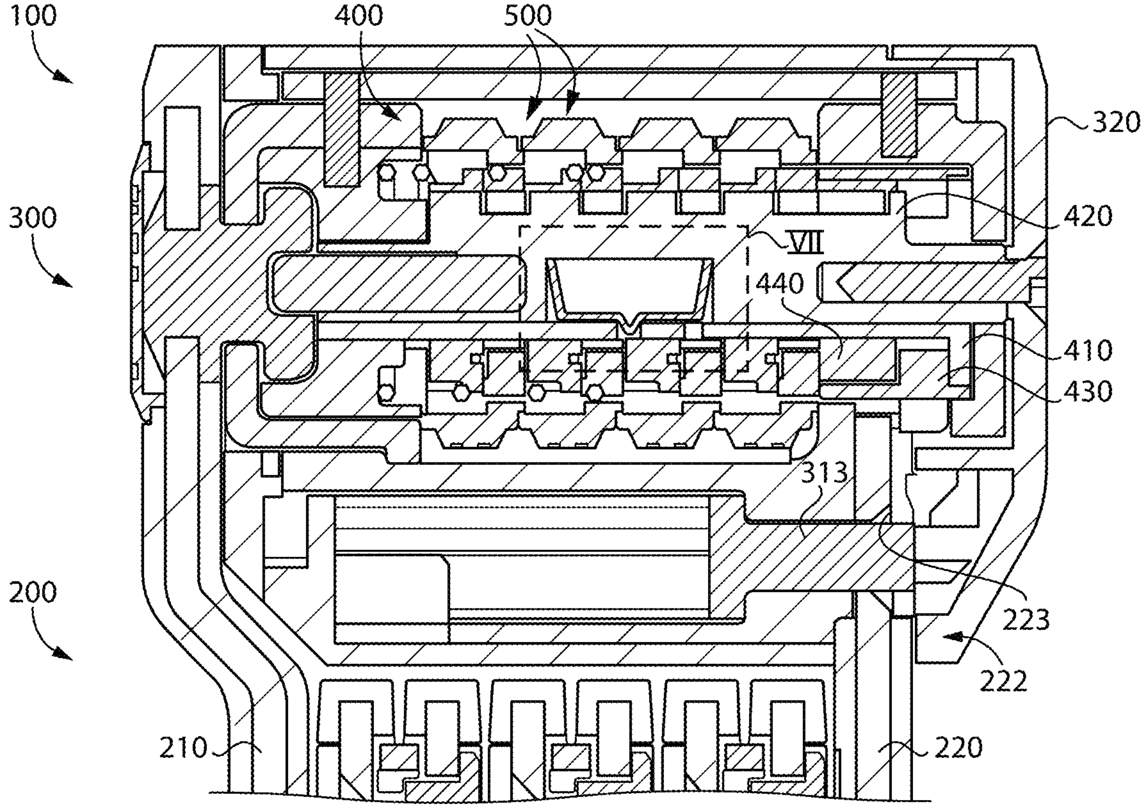
FIG. 6 is a cross-sectional view of a portion of the lock apparatus in a locked state.
Figure 7:
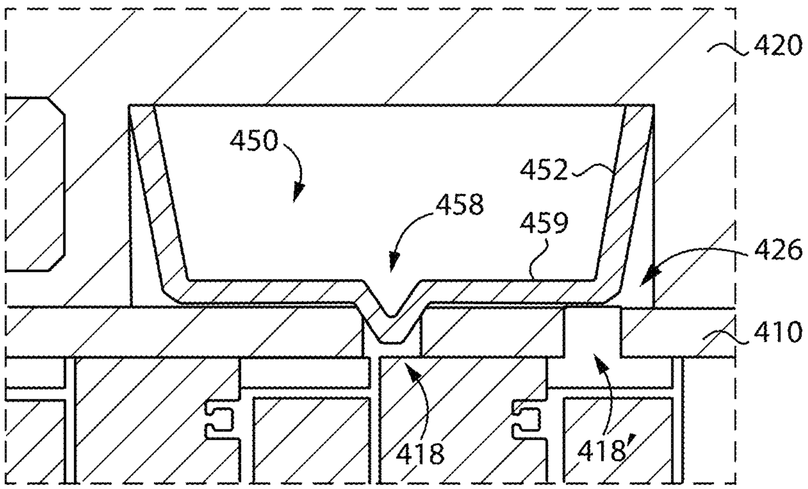
FIG. 7 is an enlarged view of a portion of the cross-sectional view illustrated in FIG. 6, and illustrates features associated with a detent mechanism according to certain embodiments.

With additional reference to FIGS. 6 and 7, illustrated therein is the lock apparatus 100 in its locked state. In the locked state, the slider 320 is in its closed position, and prevents removal of the second end portion 222 of the second link 220 from the housing 310 as described above. Additionally, at least one of the code units 500 is in its locking state and prevents distal movement of the inner spindle 420 and the slider 320, thereby retaining the slider 320 in its closed position. In the closed position, the slider 320 blocks access to the reset collar 430, and thereby prevents the user from recoding the lock mechanism 400. Moreover, the projection 458 of the detent mechanism 450 is received in a first recess 418 of the outer spindle 410, and thereby resists distal or opening movement of the inner spindle 420 and the slider 320.

In order to transition the lock apparatus 100 to its unlocked state, the user may enter the proper code into the lock mechanism 400 by aligning the appropriate indicia 513 within the window 315. When the correct code is entered, each of the code units 500 is in its unlocking state, and the slider 320 can be moved to its open position as described above. While such movement is resisted by the detent mechanism 450, application of a sufficient pulling force to the slider 320 causes a ramped side 459 of the projection 458 to engage a wall of the first recess 418, thereby urging the projection 458 out of engagement with the recess 418. The sufficient pulling force thus overcomes the resistance provided by the detent mechanism 450, thereby permitting the slider 320 to move toward its open position.

As the slider 320 travels toward the open position, the tip of the projection 528 rides along the inner surface of the outer spindle 410. As a result, the detent mechanism 450 produces less resistance to movement of the slider 320 when the slider 320 is intermediate the open position and the closed position. As the slider 320 approaches the open position, the projection 458 enters a second recess 418', which is positioned distally of the first recess 418. As the projection 458 enters the second recess 418', the biasing of the detent mechanism 450 snaps the projection 458 into the second recess 418', which may provide audible and/or tactile feedback indicating that the slider 320 has reached its fully open position.

Figure 8:
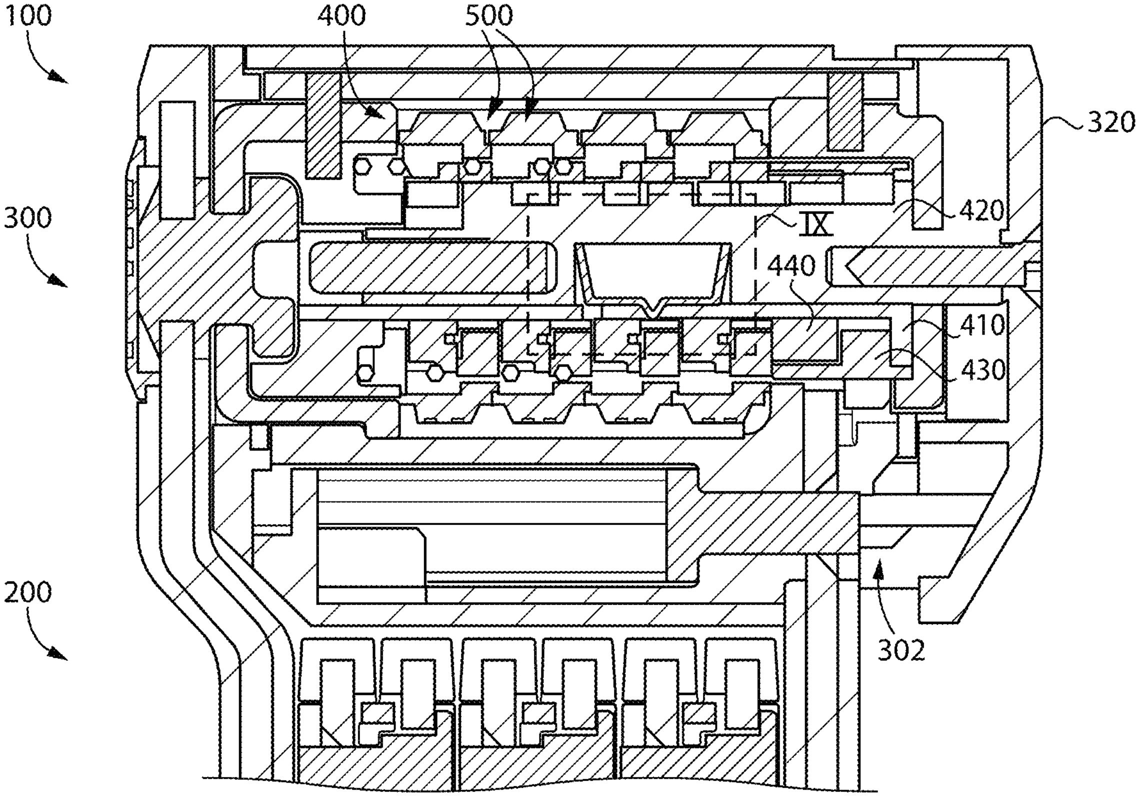
FIG. 8 is a cross-sectional view of a portion of the lock apparatus in an unlocked state.
Figure 9:
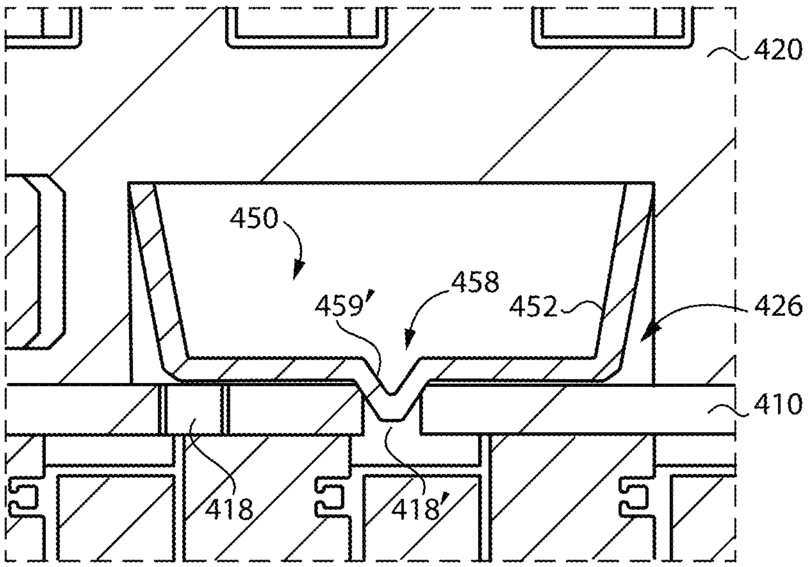
FIG. 9 is an enlarged view of a portion of the cross-sectional view illustrated in FIG. 8, and illustrates features associated with the detent mechanism.

With additional reference to FIGS. 8 and 9, illustrated therein is the lock apparatus 100 in its unlocked state, in which the slider 320 is in its open position, and the first end portion 222 of the second link 220 can be removed from the housing 310. With the slider 320 in its open position, an opening 302 is formed in the lock head 300, and the reset collar 430 is accessible as described herein. Additionally, the projection 458 of the detent mechanism 450 is received in the second recess 418' of the outer spindle 410, and thereby resists proximal movement of the inner spindle 420 and the slider 320.

In order to return the lock apparatus 100 to its locked state, the user may urge the slider 320 proximally toward its closed position. While such movement is resisted by the detent mechanism 450, application of a sufficient pushing force to the slider 320 causes a ramped side 459' of the projection 458 to engage the wall defining the second recess 418', thereby urging the projection 458 out of engagement with the second recess 418'. The sufficient pushing force thus overcomes the resistance provided by the detent mechanism 450, thereby permitting the slider 320 to move toward its closed position.

As the slider 320 travels toward the closed position, the tip of the projection 528 rides along the inner surface of the outer spindle 410. As a result, the detent mechanism 450 produces less resistance to movement of the slider 320 when the slider 320 is intermediate the open position and the closed position. As the slider 320 approaches the closed position, the projection 458 again enters the first recess 418. As the projection 458 enters the first recess 418, the biasing of the detent mechanism 450 snaps the projection 458 into the first recess 418, which may provide audible and/or tactile feedback indicating that the slider 320 has reached its fully closed position.

Figure 11:
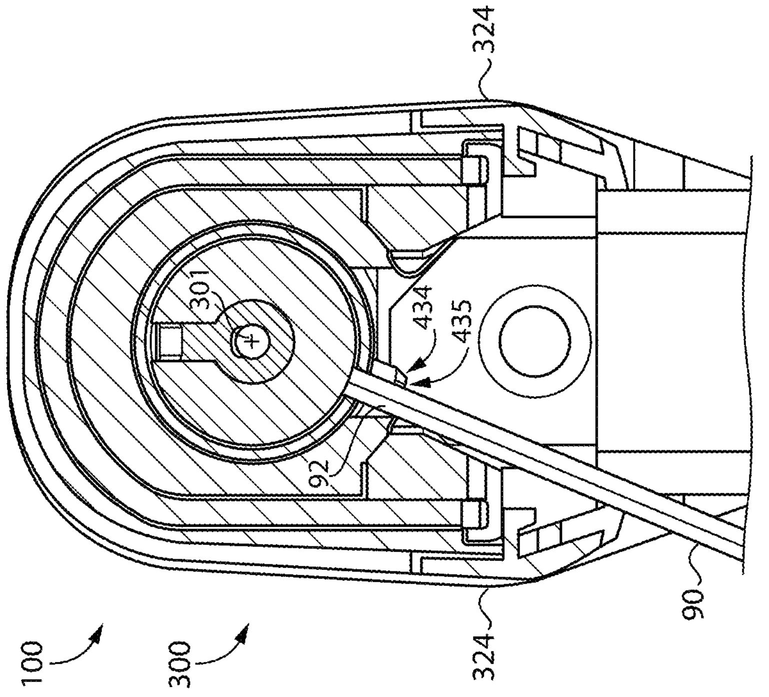
FIG. 11 is a cross-sectional views of a portion of the lock apparatus while in a reset state.
Figure 10:
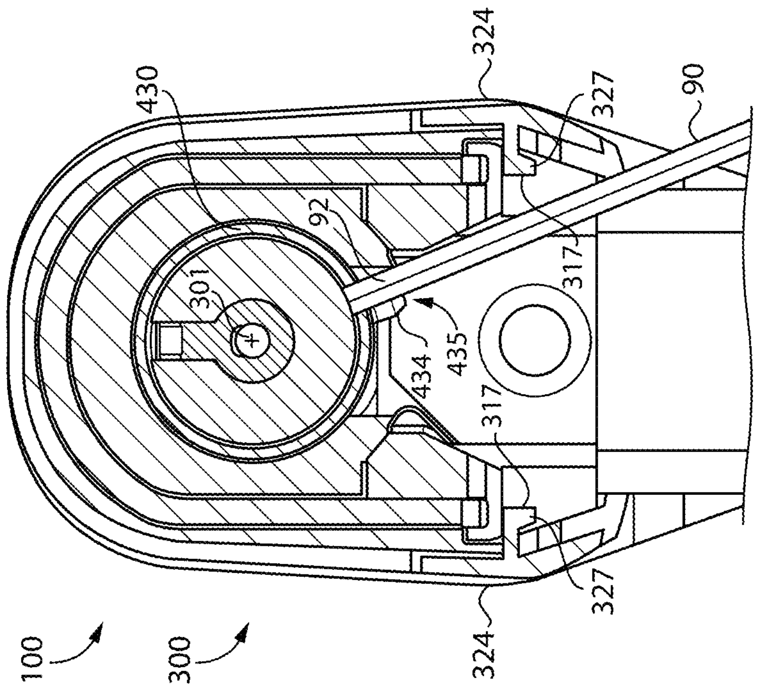
FIG. 10 is a cross-sectional view of a portion of the lock apparatus while in an operating state.

With additional reference to FIGS. 10 and 11, when the slider 320 is in its open position, a mechanical tool 90 (e.g., a hex key, screwdriver, or another thin and rigid member) may be inserted into the opening 302 such that a tip 92 of the tool 90 engages the opening 435 defined by the post 434 of the reset collar 430. The tool 90 may then be pivoted about the longitudinal axis 301 in a first direction (clockwise in FIGS. 10 and 11) to thereby rotate the reset collar 430 from its home position (FIG. 10) to its reset position (FIG. 11). Such rotation of the reset collar 430 causes the projections 431 to engage the ramps 441, thereby proximally urging the cam collar 440 toward its reset position. Movement of the cam collar 440 toward its reset position proximally drives the inner dials 520 out of engagement with the outer dials 510 against the distal biasing force of the bias mechanism 402.

With the inner dials 520 disengaged from the outer dials 510, the outer dials 510 can be rotated to a new code combination, while engagement of the outer spindle splines 412 with the inner dial channels 522 retains the inner dials 520 in the unlocking positions thereof. Once the new combination has been set, the tool 90 may then be pivoted about the longitudinal axis 301 in a second direction (counterclockwise in FIGS. 10 and 11) to thereby rotate the reset collar 430 from its reset position (FIG. 11) to its home position (FIG. 10). Such rotation of the reset collar 430 permits the cam collar 440 to move distally under the urging of the bias mechanism 402, which in turn permits the inner dials 520 to return to engagement with the outer dials 510 under the distal biasing force of the bias mechanism 402. The tool 90 may then be removed from the opening 302, and the slider 320 may be returned to its closed position. The lock mechanism 400 will now be unlocked when the new authorized code has been entered via the combination lock mechanism 400.

In the illustrated form, the lock apparatus 100 comprises a mechanical combination lock mechanism 400 in which the code is entered via a plurality of dials 510. It is also contemplated that other embodiments of the present application may involve an electronic combination lock in which the code is entered electronically. In such forms, the reset mechanism may comprise a button that is exposed when the slider 320 is in its open position, and is covered when the slider 320 is in its closed position. In certain forms, such a button may be manually accessible. In certain forms, a button may be configured to be engaged by a tool, for example in the event that the opening 302 is too small for an average human finger to enter.

As should be evident from the foregoing, the reset mechanism 404 is operable to place the lock mechanism 400 in its reset mode when appropriately manipulated. In the illustrated form, appropriate manipulation of the reset mechanism 404 comprises rotation of the reset collar 430. It is also contemplated that appropriate manipulation of the reset mechanism 404 may take another form. As one example, appropriate manipulation of the reset mechanism 404 may comprise exerting a longitudinal force that drives the inner dials 520 out of engagement with the outer dials 510. As another example, appropriate manipulation of the reset mechanism 404 may involve actuating a button, for example in embodiments in which the lock apparatus 300 comprises an electronic reset mechanism.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock apparatus, comprising:
a shackle comprising an engagement portion; and
a lock head operable to selectively engage the engagement portion to thereby retain the lock apparatus in a closed condition, the lock head comprising:
a housing;
a slider mounted for sliding movement relative to the housing between a closed position, in which the slider prevents removal of the engagement portion from the lock head, and an open position, in which the slider permits removal of the engagement portion from the lock head; and
a detent mechanism configured to selectively resist movement of the slider from the closed position toward the open position, and to selectively resist movement of the slider from the open position toward the closed position; and
wherein the slider is at least selectively operable to move from the closed position to the open position in response to an axial pulling force urging the slider away from the housing.

2. The lock apparatus of claim 1, further comprising a lock mechanism having a locked state and an unlocked state;
wherein the lock mechanism in the locked state retains the slider in the closed position; and
wherein the lock mechanism in the unlocked state permits movement of the slider from the closed position toward the open position.

3. The lock apparatus of claim 1, wherein the detent mechanism comprises a first detent feature, a second detent feature, a third detent feature, and a bias member;
wherein the bias member is configured to urge the first detent feature into engagement with the second detent feature when the slider is in the closed position to thereby resist movement of the slider from the closed position; and
wherein the bias member is configured to urge the first detent feature into engagement with the third detent feature when the slider is in the open position to thereby resist movement of the slider from the open position.

4. The lock apparatus of claim 1, wherein the detent mechanism is further configured to generate audible and/or tactile feedback when the slider reaches the closed position and/or the open position.

5. The lock apparatus of claim 1, further comprising a combination lock mechanism configured to prevent movement of the slider from the closed position to the open position when an authorized code has not been inputted to the combination lock mechanism and to permit movement of the slider from the closed position to the open position when the authorized code has been inputted to the combination lock mechanism.

6. The lock apparatus of claim 5, further comprising a reset mechanism operable to change the authorized code;
wherein the reset mechanism is inaccessible when the slider is in the closed position; and
wherein the reset mechanism is accessible when the slider is in the open position.

7. The lock apparatus of claim 1, wherein the detent mechanism is configured to exert a resistance force on the slider to selectively resist movement of the slider from the closed position toward the open position, and wherein when the axial pulling overcomes the resistance force, the slider is permitted to move from the closed position toward the open position.

8. The lock apparatus of claim 1, wherein the detent mechanism comprises:

a bias member defining a first detent feature, wherein the first detent feature comprises one of a recess or a protrusion;

a second detent feature configured to engage the first detent feature when the slider is in the closed position; and a third detent feature configured to engage the first detent feature when the slider is in the open position.

9. The lock apparatus of claim 8, wherein the bias member is mounted for movement with one of the housing or the slider; and wherein each of the second detent feature and the third detent feature is mounted for movement with the other of the housing or the slider.

10. A lock apparatus, comprising:

a shackle comprising an engagement portion; and a lock head operable to selectively engage the engagement portion to thereby retain the lock apparatus in a closed condition, the lock head comprising:

a housing;

a slider mounted for sliding movement relative to the housing between a first position and a second position, wherein the slider is operable to be urged from the first position toward the second position by a first force; and a detent mechanism configured to exert a first resistance force on the slider to selectively resist movement of the slider from the first position toward the second position, thereby preventing the first force from driving the slider from the first position toward the second position when the first force is below the first resistance force, and permitting the first force to drive the slider from the first position toward the second position when the first force is above the first resistance force;

wherein one of the first position or the second position is a closed position in which the slider prevents removal of the engagement portion from the lock head;

wherein the other of the first position or the second position is an open position in which the slider permits removal of the engagement portion from the lock head; and wherein the slider is at least selectively operable to move from the closed position to the open position in response to an axial pulling force urging the slider away from the housing.

11. The lock apparatus of claim 10, further comprising a lock mechanism operable to selectively prevent the slider moving from the closed position to the open position in response to the axial pulling force.

12. The lock apparatus of claim 11, wherein the lock mechanism comprises a combination lock mechanism.

13. The lock apparatus of claim 10, wherein the detent mechanism comprises a first detent feature mounted for movement with the slider, a second detent feature mounted for movement with the housing, and a bias member configured to urge the first detent feature and the second detent feature into engagement with one another when the slider is in the first position.

14. The lock apparatus of claim 13, wherein the detent mechanism further comprises a third detent feature; and wherein the bias member is further configured to urge one of the first detent feature or the second detent feature into engagement with the third detent feature when the slider is in the second position to thereby resist movement of the slider from the second position.

15. The lock apparatus of claim 10, wherein the slider is operable to be urged from the second position toward the first position by a second force opposite the first force; and wherein the detent mechanism is further configured to exert a second resistance force on the slider to selectively resist movement of the slider from the second position toward the first position, thereby preventing the second force from driving the slider from the second position toward the first position when the second force is below the second resistance force, and permitting the second force to drive the slider from the second position toward the first position when the second force is above the second resistance force.

16. A lock apparatus, comprising:

a shackle comprising an engagement portion; and a lock head operable to selectively engage the engagement portion to thereby retain the lock apparatus in a closed condition, the lock head comprising:

a housing;

a combination lock mechanism mounted to the housing and configured to facilitate entry of an input code, wherein the combination lock mechanism is configured to move from an unlocking state to a locking state in response to the input code matching an authorized code;

a reset mechanism operable to place the combination lock mechanism in a reset mode in which the authorized code is changeable; and a slider mounted for movement relative to the housing between an open position in which the reset mechanism is accessible via an opening in the lock head and the engagement portion is removable from the lock head, and a closed position in which the slider prevents access to the reset mechanism and the engagement portion is not removable from the lock head; and wherein the combination lock mechanism is configured to retain the slider in the closed position when the combination lock mechanism is in the locking state and to permit movement of the slider from the closed position to the open position when the combination lock mechanism is in the unlocking state.

17. The lock apparatus of claim 16, wherein the slider includes a pair of arms; and wherein, with the slider in the open position, the opening is defined between the pair of arms.

18. The lock apparatus of claim 16, wherein the reset mechanism is configured to place the combination lock mechanism in the reset mode when the reset mechanism is rotated from a home position to a reset position.

19. The lock apparatus of claim 18, wherein the reset mechanism is configured to retain the slider in the open position when the reset mechanism is in the reset position.

20. The lock apparatus of claim 16, further comprising a detent mechanism configured to selectively resist movement of the slider from the closed position and/or the open position.

* * * * *